(12) United States Patent
Nishizawa et al.

(10) Patent No.: US 6,383,308 B1
(45) Date of Patent: May 7, 2002

(54) TORSION BAR FOR SEAT BELT RETRACTOR

(75) Inventors: Muneo Nishizawa; Yasushi Kanamori; Joji Mishina, all of Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/609,409

(22) Filed: Jul. 3, 2000

Related U.S. Application Data

(60) Provisional application No. 06/142,062, filed on Jul. 2, 1999, and provisional application No. 60/180,693, filed on Feb. 7, 2000.

(51) Int. Cl.⁷ .......................... C22C 38/00; C22C 38/12; C22C 38/14
(52) U.S. Cl. .......................... 148/320; 420/8; 420/126; 420/127
(58) Field of Search .................... 420/8, 126, 127; 148/320

(56) References Cited

U.S. PATENT DOCUMENTS 4,533,391 A * 8/1985 Borneman et al.
6,186,432 B1 * 2/2001 Koning .................... 242/379.1

* cited by examiner

*Primary Examiner*—Deborah Yee
(74) *Attorney, Agent, or Firm*—Foley & Lardner

(57) ABSTRACT

To provide a torsion bar for the use of a seat belt retractor which can be manufactured without a spheroidizing annealing process. A torsion bar to be used as a load limiter in a seat belt retractor is characterized in that the torsion bar is made of steel of which the carbon content is 0.04% or less.

2 Claims, 2 Drawing Sheets

TORSION BAR FOR SEAT BELT RETRACTOR

This case claims benefit of 60/142,062 filed Jul. 2, 1999 which claims benefit of 60/180,693 filed Feb. 7, 2000.

BACKGROUND OF THE INVENTION

1. Field of the Invention

The present invention relates to a torsion bar to be used as a load limiter in a seat belt retractor.

2. Description of the Related Art

FIG. 2 is an exploded perspective view schematically showing one example of a seat belt retractor. Housed in a base frame 1 is a spool 2 on which a seat belt is wound. A torsion bar 3 has a first hexagonal portion 3a which is fitted into and fixed to a hexagonal hole of a locking base 4. The locking base 4 has a thread portion 4a which is threaded into a stopper 5. The stopper 5 is fitted into a hole 2a of the spool 2.

The torsion bar 3 has a second hexagonal portion 3b which is fitted into and fixed to a hexagonal hole formed in a portion of the hole 2a of the spool 2 near a speed-reduction/clutch mechanism casing 10.

A portion of the torsion bar 3 near its one end is fitted into a lock gear 6. Through the lock gear 6, the torsion bar 3 is supported by a retainer 7. The other end of the torsion bar 3 is journaled to the gear in the speed-reduction/clutch mechanism casing 10 through a spline shaft. The lock gear 6 and a flywheel 8 compose a lock activating mechanism called a webbing sensor. When the spool 2 rotates at an acceleration higher than a preset value, i.e., the seat belt is rapidly withdrawn, a projection of a flywheel 8 engages one of the internal teeth formed in the retainer 7 to stop the rotation of the lock gear 6. Therefore, relative rotation is caused between the lock gear 6 and the locking base 4. This brings a projection of a pawl 4b to protrude circumferentially outside of the locking base 4 so that the projection of the pawl 4b engages one of the ratchet teeth 1b formed around an opening 1a of the base frame 1 to stop the rotation of the locking base 4. As the rotation of the locking base 4 is stopped, the rotation of the first hexagonal portion 3a of the torsion bar 3 is also stopped.

The seat belt retractor is further provided with a vehicle sensor 9 which acts to stop the rotation of the lock gear 6, i.e., stop the rotation of the locking base 4 when a vehicle tilts at an angle exceeding a preset angle or is subjected to acceleration or deceleration exceeding a preset value.

When a webbing sensor or the vehicle sensor is actuated to stop the rotation of the locking base 4, the rotation of the first hexagonal portion 3a of the torsion bar 3 is stopped. Since the second hexagonal portion 3b of the torsion bar 3 is fixed to the spool 2, the spool 2 still rotates while a body portion 3c of the torsion bar 3 is twisted so that relative rotation is caused between the stopper 5 fitted in the spool 2 which is rotating and the locking base 4 which is stopped from rotating so that the stopper 5 is introduced by a threaded portion 4a of the locking base 4 to come closer to an end surface of the locking base 4. During this, the spool 2 is allowed to rotate because the body portion 3c of the torsion bar 3 is twisted even though the rotation of the locking base 4 is stopped. After that, the stopper 5 comes in contact with the end surface-of the locking base 4 and is thus stopped from further rotating. This also stops the rotation of the spool 2.

That is, as the webbing sensor or the vehicle sensor is actuated, the spool 2 is allowed to rotate a predetermined number of turns after the actuation of the sensor and is then stopped from rotating. During this, force acting on the spool 2 in a direction withdrawing the seat belt is absorbed to some extent by plastic deformation of the twisted torsion bar 3, thereby softening shock applied to a vehicle occupant. Since this structure of a seat belt retractor mentioned above (that is, the structure absent the present invention) is basic and well known in the art, further description about this structure will be omitted.

In the seat belt retractor shown in FIG. 2, reduction gears and a clutch are provided m the speed-reduction/clutch mechanism casing 10 to reduce the speed of rotation of a pinion 12 driven by a motor 11 and to transmit the rotation to the torsion bar 3. Since this portion of FIG. 2 is not related directly to the present invention, further description about this structure will be omitted.

As described above, the torsion bar functions as a load limiter which produces torsional torque whereby the seat belt is allowed to be pulled out with somewhat resistance in the event of an emergency such as a vehicle collision. For this, it is preferable that the number of turns until broken is so large as to withstand as large a torque as possible.

In a conventional manner to achieve this property of a torsion bar, steel of which the carbon content is 0.06–0.18 wt % is used as the material of the torsion bar and spheroidizing annealing is conducted to the steel. That is, in the manufacturing process of torsion bars, wire rods are processed by acid cleaning, primary drawings, spheroidizing annealing, acid cleaning, surface treatment, and secondary drawing and the processed wire rods are used as the material for torsion bars.

SUMMARY OF THE INVENTION

However, the conventional manufacturing process of torsion bars requires spheroidizing annealing as mentioned above, making the process complex and increasing the cost.

The present invention is made to solve this problem and provide a torsion bar for a seat belt retractor which can be manufactured without spheroidizing annealing.

A first embodiment to solve the aforementioned problem is a torsion bar to be used as a load limiter in a seat belt retractor: characterized in that the torsion bar is made of steel of which the carbon content is 0.04 wt % or less.

Inventors of this invention discovered, through various experimentations about the material of a torsion bar to be used as a load limiter in a seat belt retractor, that steel of which the carbon content is 0.04 wt % enables one to manufacture a torsion bar which can provide enough properties as a load limiter such as the number of torsional turns and the torsional torque even without spheroidizing annealing. This is because as the carbon content is decreased, the percentage of ferrite in the steel is increased and the uniformity of tissue of the steel may be improved. In the conventional one having 0.06 wt % or more of carbon content, enough property in the number of torsional turns can not be obtained when a spheroidizing annealing process is omitted.

In the first embodiment of the invention, the constituents of the steel besides carbon are not limited and may be the same constituents of steel used as the material for a conventional torsion bar.

A second embodiment to solve the aforementioned problem is a torsion bar to be used as a load limiter in a seat belt retractor characterized in that the torsion bar is made of steel containing 0.04 wt % or less of carbon and at least one of 0.01–0.05 wt % of Ti and 0.01–0.05 wt % of Nb.

This second embodiment of the invention further contains at least one of 0.01–0.05 wt % of Ti and 0.01–0.05 wt % of Nb in addition to the constituents of the steel of the first embodiment. Ti and/or Nb is added to fix N and C and form deposit including P, S, thereby improving workability. Less than 0.01 wt % of Ti or Nb less provides too poor efficiency, while more than 0.05 wt % of Ti or Nb rather harms than improves the workability. Therefore, the content is limited to the aforementioned range.

As described in the above, according to the present invention, a torsion bar can be manufactured without spheroidizing annealing process, and a seat belt retractor can be provided which can provide uniform properties such as the number of torsional turns and the torsional load.

DETAILED DESCRIPTION OF THE PREFERRED EMBODIMENT

A torsion bar was made of steel containing the constituents (wt %) (the residual is substantially Fe) shown in Table 1 as Example 1. A torsion bar was also made of steel containing the constituents (wt %) (the residual a substantially Fe) shown in Table 1 as the Comparative Example. These torsion bars were compared to each other about the number of turns until broken and torsional torque. Both Example 1 and the Comparative Example were not processed by spheroidizing annealing.

Figure 1:
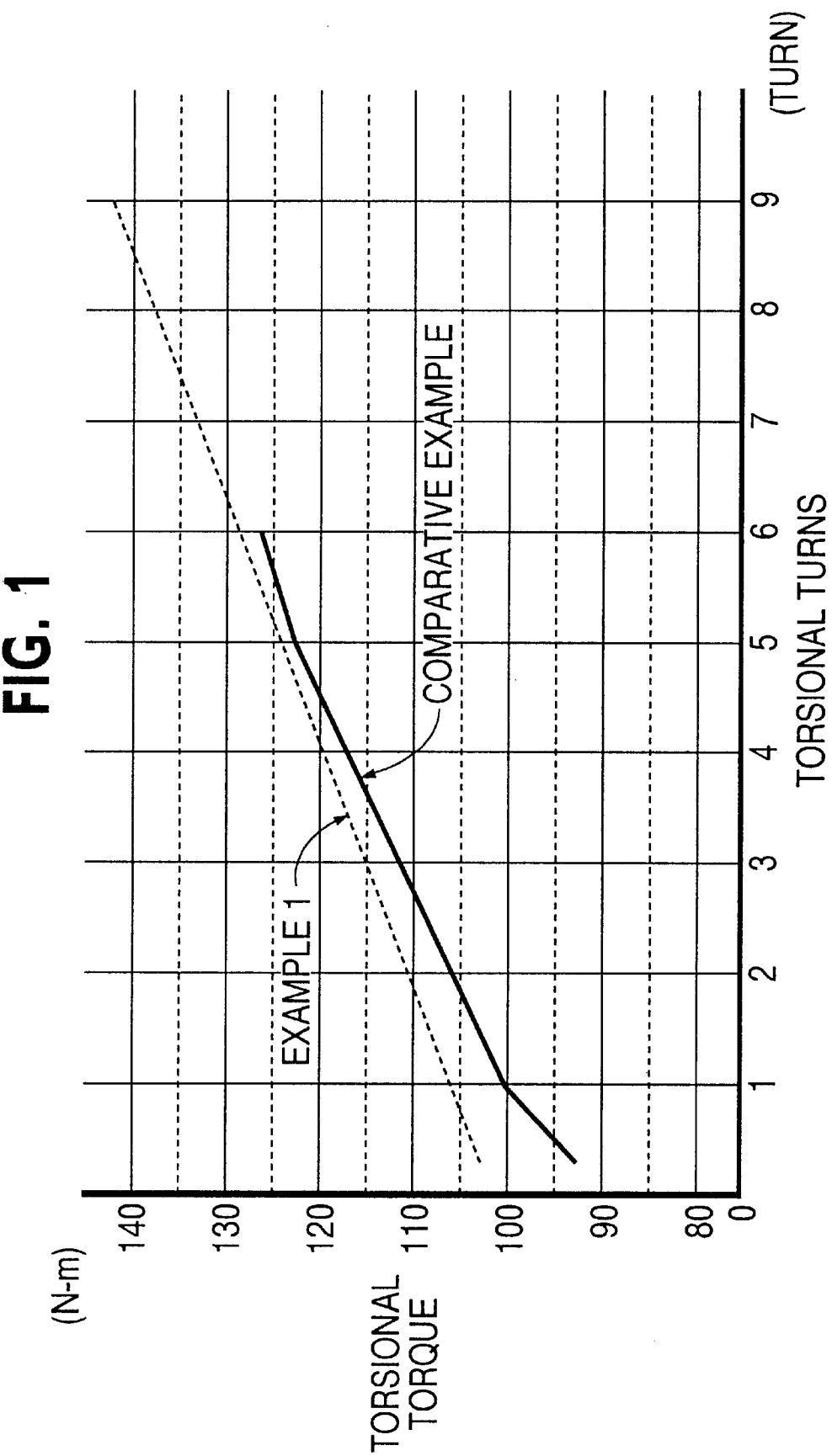
FIG. 1 is a diagram showing the relation in the number of torsional turns and the torsional torque between Example 1 and Comparative Example.
Figure 2:
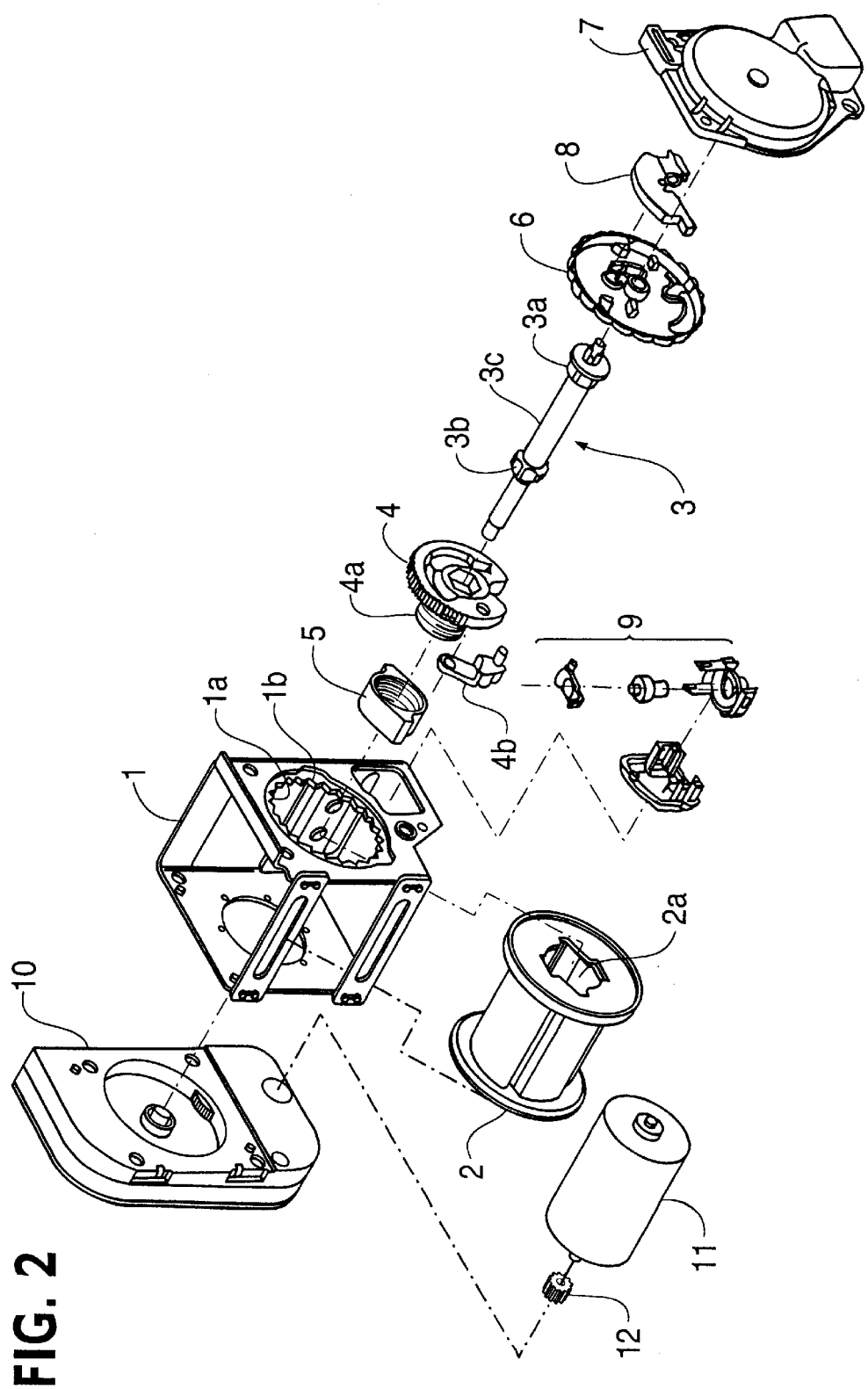
FIG. 2 is an exploded perspective view schematically showing one example of a seat belt retractor that could use the load limiter of the present invention.

The results are shown in a diagram of FIG. 1. In the Comparative Example, the torsion bar was broken when twisted 6 turns and the maximum torsional torque of the torsion bar was about 125 N-m. On the other hand, in Example 1, the torsion bar was not broken even after being twisted 9 turns and the maximum torsional torque of the torsion bar was more than 140 N-m. From the results, it was found that, even without the process of spheroidizing annealing, the torsion bar of Example 1 can provide torsional torque larger than that of a conventional one.

|  | C | Si | Mn | P | S |
|---|---|---|---|---|---|
| Example 1 | 0.02 | 0.01 | 0.35 | 0.007 | 0.008 |
| Comparative Example | 0.15 | 0.01 | 0.46 | 0.018 | 0.009 |

Torsion bars were made of steel containing the constituents (wt %) (the residual is substantially Fe) shown in Table 2 as Example 2 and Example 3, respectively. The number of turns until broken and torsional torque of these torsion bars were measured. Both Example 2 and Example 3 were not processed by spheroidizing annealing.

|  | C | Si | Mn | P | S | Ti | Nb |
|---|---|---|---|---|---|---|---|
| Example 2 | 0.03 | 0.01 | 0.38 | 0.010 | 0.006 | 0.025 | — |
| Example 3 | 0.02 | 0.02 | 0.40 | 0.008 | 0.007 | — | 0.024 |

In both Example 2 and Example 3, the torsion bars were not broken even after being twisted 9.5 turns and the maximum torsional torque of the torsion bar was more than 145 N-m. From the results, it was found that the torsion bars of Example 2 and Example 3 had improved properties as compared to Example 1 (Example 1 did not contain Ti and Nb).

The priority documents here, 60/142,062 and 60/180,693 are hereby incorporated by reference.

We claim:

1. A load limiter for a seat belt retractor comprising: a torsion bar, wherein the torsion bar is made of steel having a carbon content of 0.04 wt % or less, wherein the steel is not spheroidized annealed.

2. A load limiter for a seat belt retractor comprising: a torsion bar, wherein the torsion bar is made of steel containing 0.04 wt % or less of carbon and at least one of 0.01–0.05 wt % of Ti and 0.01–0.05 wt % of Nb.

* * * * *